UNITED STATES PATENT OFFICE.

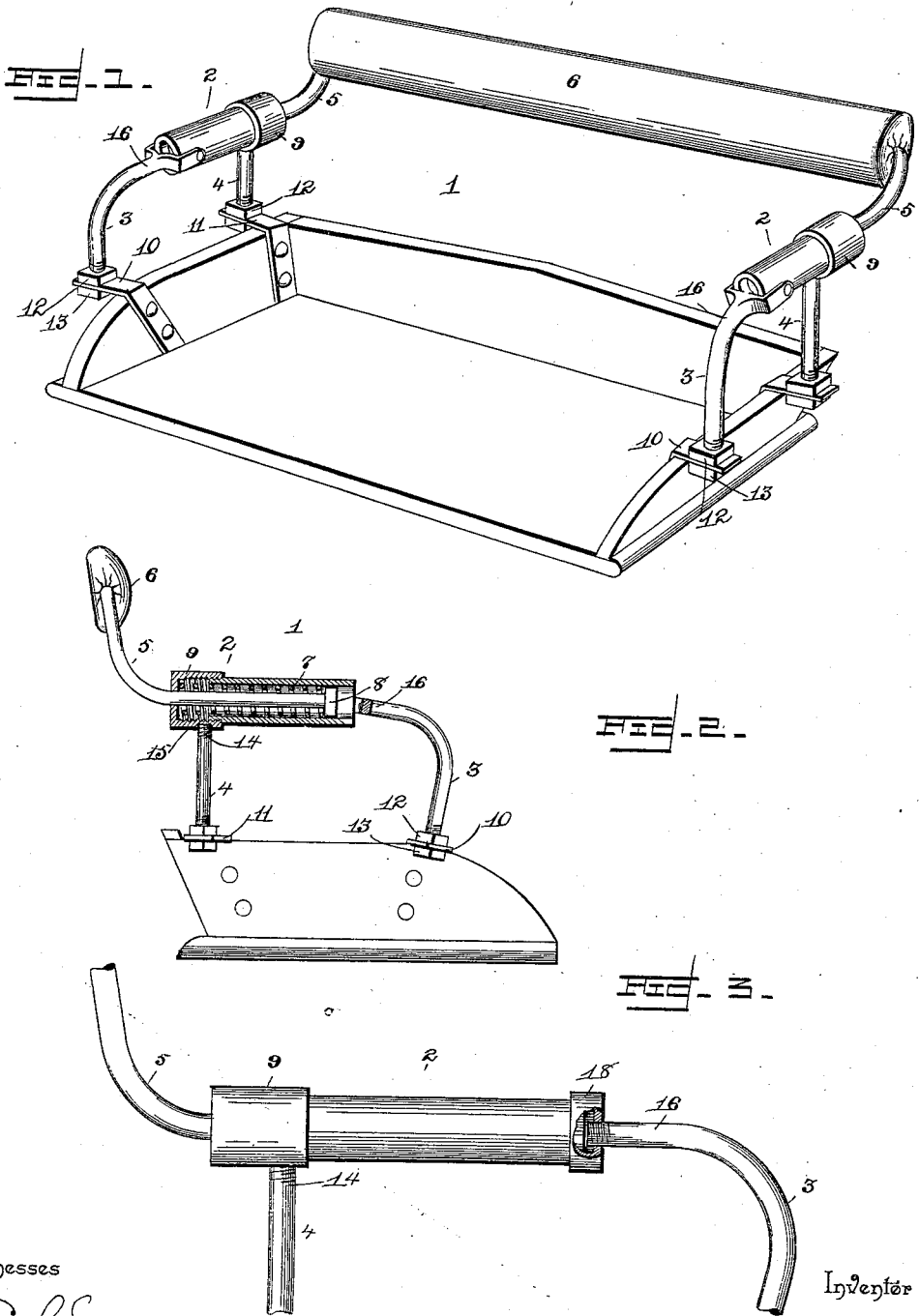

GEORGE ELMAR DANIEL, OF THOMPSON, MISSOURI.

WAGON-SEAT.

SPECIFICATION forming part of Letters Patent No. 473,211, dated April 19, 1892.

Application filed September 4, 1891. Serial No. 404,776. (No model.)

*To all whom it may concern:*

Be it known that I, GEORGE ELMAR DANIEL, a citizen of the United States, residing at Thompson, in the county of Audrain and State of Missouri, have invented a new and useful Wagon-Seat, of which the following is a specification.

This invention relates to improvements in vehicle-seats.

The object of the present invention is to provide a seat having a yielding back to prevent the occupant being jolted by horse motion caused by uneven roads and the like.

A further object of the invention is to enable the back of the seat to be forced rearward, so that the occupants may lean backward and resume a slightly-inclined position.

The invention consists in the construction and novel combination and arrangement of parts hereinafter fully described, illustrated in the accompanying drawings, and pointed out in the claim hereto appended.

In the drawings, Figure 1 is a perspective view of a vehicle-seat constructed in accordance with this invention. Fig. 2 is an end elevation, partly in section. Fig. 3 is a side elevation of a modification of the invention.

Referring to the accompanying drawings, 1 designates a vehicle-seat having tubular arms 2, supported by front and rear braces 3 and 4 and adapted to receive curved bars 5 of a back 6, which is adapted to be forced rearward against the action of spiral springs 7, arranged within the tubular arms 2 and interposed between the front end of the bar 5 and the rear end of the tubular arm, whereby a cushion is formed to take shock and to prevent persons being jolted while a vehicle is passing over rough roads and prevent persons being jolted in two-wheeled vehicles by horse motion. The bars 5 have their front ends threaded and provided with nuts 8, which engage the front ends of the springs, and the rear ends of the tubular arms are threaded and are engaged by caps 9, having central openings to receive the bars 5 of the back 6. The front and rear bases 3 and 4 have their lower ends threaded and secured to plates 10 and 11 by nuts 12 and 13, arranged on the upper and lower faces of the plates. The upper end 14 of the rear brace 4 is threaded and engages the threaded opening 15 of the cap 9, whereby the latter is prevented unscrewing accidentally, and the upper end 16 of the front end is provided with prongs, which are pivoted to opposite sides of the tubular arm 2. The plates 10 and 11 are bent at an angle and have one portion secured to the seat and the other portion extending out horizontally therefrom to receive the braces.

It will be seen that the vehicle-seat is simple and comparatively inexpensive in construction and that it forms a cushion to take up shocks to prevent the occupants of a vehicle being jolted while passing over rough roads and while riding in two-wheel vehicles to prevent the horse motion jolting the occupants. The back also permits a person when tired of riding in an upright position to recline.

In two-wheeled vehicles the invention is specially advantageous, as it prevents the peculiar horse motion which accompanies this class of vehicles, causing the back of the seat to strike the occupants, as is the case with the ordinary rigid seats.

In Fig. 3 of the accompanying drawings is illustrated a modification of the invention in which the tubular arms are provided at their front ends with caps 18, provided with threaded openings, and the front braces have their upper ends threaded and engaging the threaded openings of the caps.

What I claim is—

The combination, in a vehicle-seat, of a back provided with curved bars, the tubular arms receiving the bars and having their rear ends threaded, the caps arranged on the threaded ends and provided with central openings and having threaded openings in their lower faces, the springs arranged in the tubular arms and interposed between the caps and the front ends of the bars, the plates 10 and 11, secured to the seat and extending horizontally therefrom, the rear braces having their lower ends threaded and adjustably secured to the plates 11 by the nuts and having their upper ends threaded and engaging the threaded openings of the caps to prevent the latter accidentally unscrewing, and the curved front braces having their upper ends forked and pivoted to the front ends of the arms and having their lower ends threaded and secured to the plates 10 by nuts arranged on the upper and lower faces of the same, substantially as described.

In testimony that I claim the foregoing as my own I have hereto affixed my signature in the presence of two witnesses.

GEORGE ELMAR DANIEL.

Witnesses:
 THOS. ATCHISON,
 S. M. EDWARDS.